US008384924B2

(12) United States Patent
Sato

(10) Patent No.: US 8,384,924 B2
(45) Date of Patent: Feb. 26, 2013

(54) IMAGE PROCESSING APPARATUS WITH A RECONSTRUCTION CIRCUIT, AND CONTROL METHOD FOR IMAGE PROCESSING APPARATUS

(75) Inventor: Yoshikazu Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 12/717,561

(22) Filed: Mar. 4, 2010

(65) Prior Publication Data
US 2010/0225948 A1 Sep. 9, 2010

(30) Foreign Application Priority Data
Mar. 5, 2009 (JP) ................................ 2009-052316

(51) Int. Cl.
G06F 3/12 (2006.01)
H04N 1/00 (2006.01)
(52) U.S. Cl. ........................................ 358/1.13; 358/1.1
(58) Field of Classification Search ................... 358/1.1, 358/1.9, 1.13, 1.14, 1.15, 1.18, 400, 469; 382/254, 260, 276, 302, 303, 304; 326/38, 326/39, 40
See application file for complete search history.

(56) References Cited

U.S. PATENT DOCUMENTS

| 5,655,069 A * | 8/1997 | Ogawara et al. ............... 714/10 |
| 6,069,489 A * | 5/2000 | Iwanczuk et al. ............. 326/40 |
| 7,362,132 B2 * | 4/2008 | Imafuku ........................ 326/38 |
| 8,183,883 B1 * | 5/2012 | Tan et al. ........................ 326/39 |
| 2005/0151994 A1 * | 7/2005 | Takahashi ................... 358/1.15 |
| 2007/0150718 A1 | 6/2007 | Toi |

FOREIGN PATENT DOCUMENTS
JP 2007-179358 A 7/2007

* cited by examiner

Primary Examiner — Gabriel Garcia
(74) Attorney, Agent, or Firm — Canon USA Inc. IP Division

(57) ABSTRACT

An image processing apparatus includes an input unit, a first storage unit, a selection unit, a second storage unit, an image processing unit, a generation unit, a control unit, and a decision unit. The image processing unit is configured to include a reconfiguration circuit, which enables reconfiguration according to circuit configuration data stored in the second storage unit, and to execute image processing on image data input by the input unit. The control unit, after performing a first setting processing for rewriting a part of the circuit configuration data stored in the second storage unit, according to the rewriting data generated by the generation unit, configured to execute control to perform reconfiguration processing for reconfiguring a circuit configuration of the image processing unit according to the circuit configuration data stored by the second storage unit.

13 Claims, 18 Drawing Sheets

FIG. 9
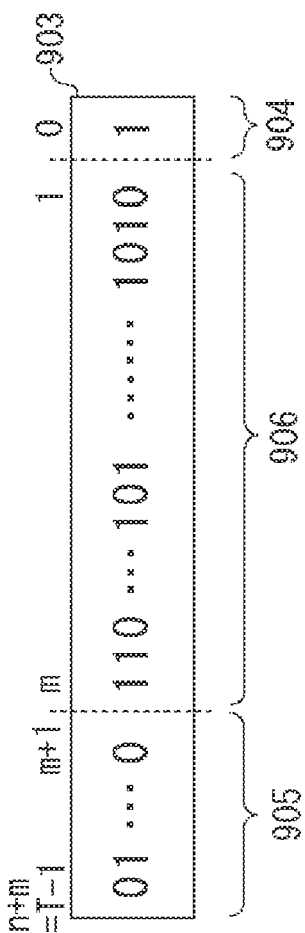
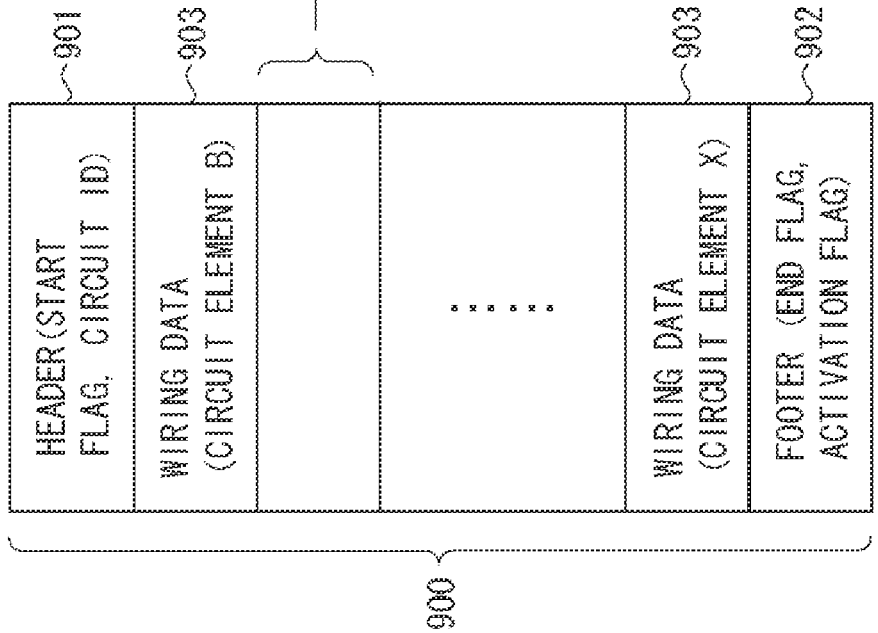

FIG. 10

SETTING INFORMATION GENERATION TABLE 1000

| COLOR | RESOLUTION (dpi) | PRINT MODE | LIGHTNESS | COLOR SATURATION | CIRCUIT ID | REGISTER SETTING INFORMATION TABLE ID |
|---|---|---|---|---|---|---|
| COLOR | 600 | PHOTOGRAPH | MEDIUM | MEDIUM | 001 | 000 |
| MONOCHROME | 2400 | CHARACTER | MEDIUM | MEDIUM | 010 | 011 |
| COLOR | 1200 | PHOTOGRAPH /CHARACTER | HIGH | HIGH | 011 | 001 |
| ... | ... | ... | ... | ... | ... | ... |
| ... | ... | ... | ... | ... | ... | ... |

802 brackets the first five columns. 1010 labels CIRCUIT ID. 1020 labels REGISTER SETTING INFORMATION TABLE ID.

IMAGE PROCESSING APPARATUS WITH A RECONSTRUCTION CIRCUIT, AND CONTROL METHOD FOR IMAGE PROCESSING APPARATUS

BACKGROUND OF THE INVENTION

1. Field of the Invention

The present invention relates to an image processing apparatus, and a control method for the image processing apparatus.

2. Description of the Related Art

A programmable logic device stores circuit configuration data relating to electronic components constituting a circuit and wirings in an external storage device (e.g., a read-only memory (ROM), a flash memory). Then, the programmable logic device is an integrated circuit that can realize arbitrary logic circuits by loading circuit configuration data as the need arises, and changing a connection state among a plurality of embedded logic elements in accordance with the loaded circuit configuration data.

A typical programmable logic device includes a field programmable gate array (FPGA). In recent years, the needs for processing suited to types and statuses of images have been increasing, along with sophistication of image information processing. In such cases, it is conceivable that the above-described needs can be satisfied by mounting the FPGA in processing apparatuses, and generating circuit configuration data optimized based on required specifications for each processing apparatus.

Further, Japanese Patent Application Laid-Open No. 2007-179358 (hereinafter Japan '358) discusses a technique, when a user wants to switch between a plurality of hardware functions as circumstances demand in one processing apparatus, for selecting and reading out circuit configuration data depending on processing, out of a plurality of circuit configuration data that has been previously stored in an external memory. When the hardware functions of the image processing apparatus are switched using the technique discussed in Japan '358, the circuit configuration data will be loaded, register setting will be performed on the configured circuit on the FPGA, and after that, image processing will be started.

When the hardware functions of the image processing apparatus are switched between the processing using the technique discussed in Japan '358, a time required for switching is a total of a time required for loading the circuit configuration data and rasterizing the circuit configuration data on the FPGA, and a time required for register setting on the configured circuit (register setting time). Therefore, there is a problem that it takes a long time to perform the processing, and thus performance of the entire processing apparatus would be eventually degraded.

In order to reduce the register setting time, a method is conceivable for preparing circuit configuration data sets each having necessary register setting value as an initial value, for all of necessary register setting values, using the technique discussed in Japan '358. However, in this method, it is necessary to store previously a huge amount of the circuit configuration data, and required memory capacity would become larger. Thus, the method is not preferable.

As described above, there are various problems in the image processing apparatus having the programmable logic device.

SUMMARY OF THE INVENTION

The present invention is directed to providing an improved image processing apparatus, and a control method therefor.

Further, the present invention is directed to providing a structure in which the need to store voluminous circuit configuration data is eliminated, and performance degradation associated with reconfiguration of a circuit can be suppressed, in the image processing apparatus provided with a reconfiguration circuit which enables reconfiguration in accordance with the circuit configuration data.

Further features of the present invention will become apparent from the following description of exemplary embodiments with reference to the attached drawings.

BRIEF DESCRIPTION OF THE DRAWINGS

The accompanying drawings, which are incorporated in and constitute apart of the specification, illustrate numerous embodiments, features and aspects of the invention and, together with the description, serve to explain the principles of the invention.

FIG. 9 illustrates circuit configuration data according to the present exemplary embodiment.

FIG. 10 illustrates a setting information generation table according to the present exemplary embodiment.

DESCRIPTION OF THE EMBODIMENTS

Figure 1:
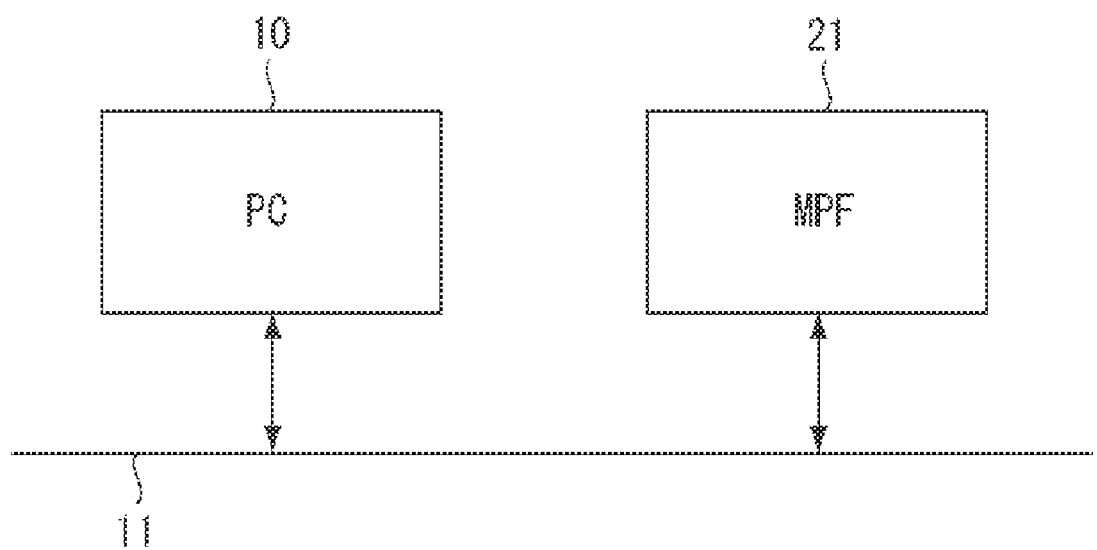
FIG. 1 is a configuration diagram of a network system embodying an exemplary embodiment of the present invention.

In the drawings, elements and parts which are identical throughout the views are designated by identical reference numerals, and duplicate description thereof is omitted.

FIG. 1 is a system configuration diagram illustrating an example of a network system to which an image forming apparatus embodying an exemplary embodiment of the present invention is applicable. As illustrated in FIG. 1, the network system according to the present exemplary embodiment includes a personal computer (PC) 10, a local area network (LAN) 11, and a multifunction peripheral (MFP) 21.

The PC 10 is an information processing terminal, such as a personal computer, a work station, or the like, and operates various applications. Further, the PC 10 issues a print command to a printer or the MFP 21 via a network line such as the local area network (LAN) 11 described below, and can transmit print data.

The LAN 11 is a part of the Internet (i.e., a giant computer network) in which networks all across the world are interconnected. Each network connects to information processing apparatuses. The PC 10 and the MFP 21, and other client PCs, servers and the like not illustrated here, are connected to the LAN 11, and each can perform communication by transmitting and receiving data via a network interface (I/F). Though not illustrated, the LAN 11 is connected to the Internet of information network communicatable with information devices all across the world via routers or the like. The MFP 21 is a device termed multifunction peripheral (MFP) or digital multifunction peripheral provided with a document scanning function, a printing function, a box function, and/or other functions, which corresponds to an image processing apparatus according to the present invention.

Figure 2:
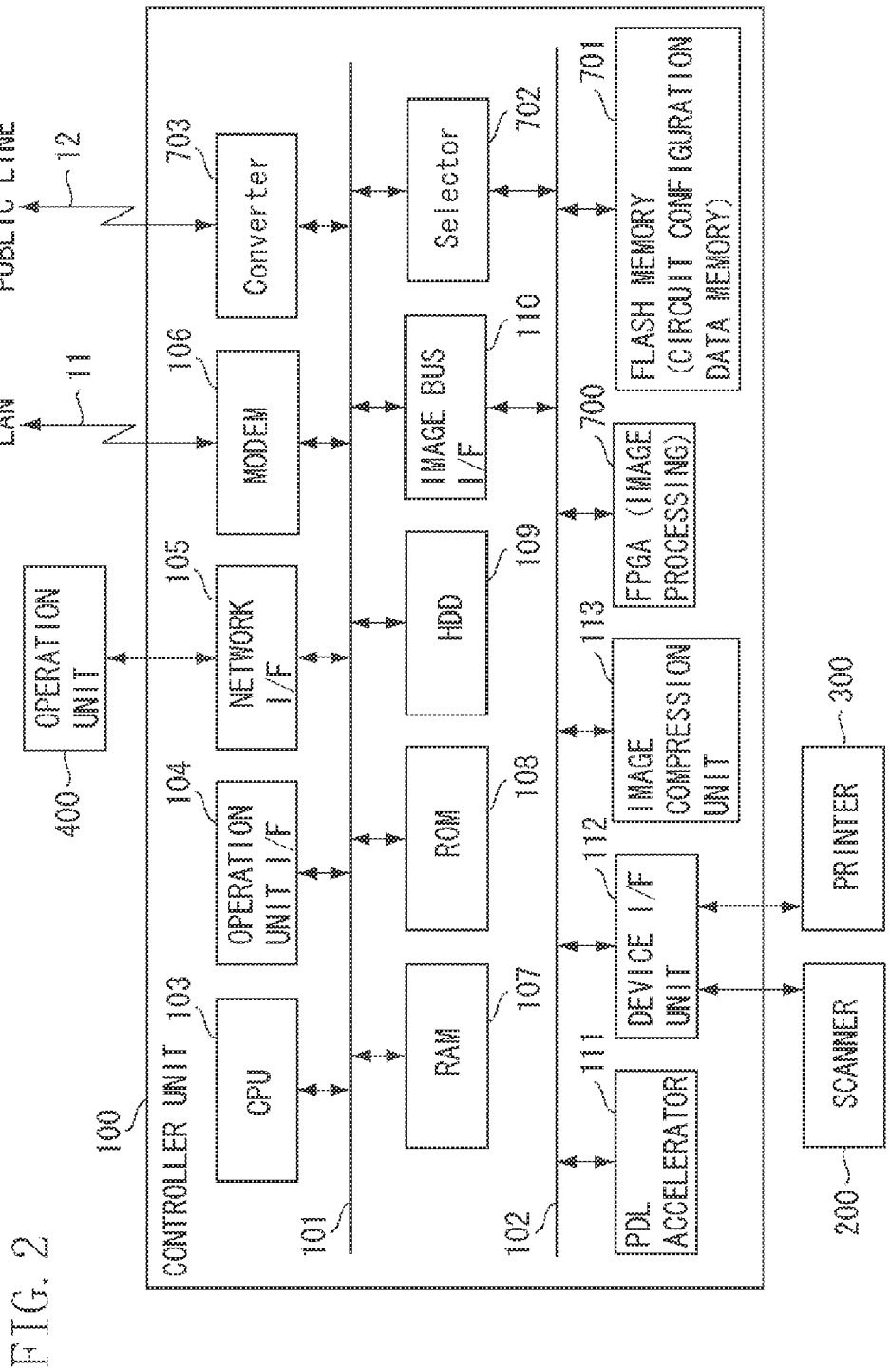
FIG. 2 is a block diagram illustrating an example of a configuration of a multifunction peripheral (MFP).

Next, an example of a configuration of the MFP 21 illustrated in FIG. 1 is shown in FIG. 2. In FIG. 2, a controller unit 100 performs input and output of image information and device information by connecting to a scanner 200 (FIG. 3) acting as an image input device, and a printer 300 (FIG. 4) acting as an image output device, and also connecting to a network such as the LAN 11, and a public line 12. Further, the controller unit 100 connects to an operation unit 400 (FIG. 5). The operation unit 400 displays information received from the controller unit 100, and notifies the controller unit 100 of instructions from a user.

In the controller unit 100, a central processing unit (CPU) 103 functions as a controller that controls the entire MFP 21 by reading out and executing a program recorded in a ROM 108. The ROM 108 (first storage unit, third storage unit) serves as a boot ROM, and stores a boot program of the MFP 21, a plurality of circuit configuration data 900 (FIG. 9) for rasterizing to a field programmable gate array (FPGA) 700, a setting information generation table 1000 (FIG. 10), a register setting information table 1100 (FIG. 11), and the like. A random-access memory (RAM) 107 is a system work memory for causing the CPU 103 to operate, and also serves as an image memory for temporarily storing image data.

A hard disk drive (HDD) 109 stores system software, image data, and private data such as address book. These pieces of data are stored after having been encoded by an image compression unit 113 described below, and they are decompressed when used. A device that is not equipped with the HDD is assumed to store these pieces of data in other storage medium (e.g., flash memory).

An operation unit I/F 104 is an interface with the operation unit 400, and outputs image data to be displayed on the operation unit 400 to the operation unit 400. Further, the operation unit I/F 104 serves to notify the CPU 103 of information that a user has input from the operation unit 400. A network I/F 105 connects to the LAN 11, and inputs and outputs information. A modem 106 connects to the public line 12, and performs modulation/demodulation processing for transmitting and receiving data. The above-described devices 103 to 109, and a selector 702 and a converter 703 described below are arranged on a system bus 101.

An image bus I/F 110 is a bus bridge that connects to the system bus 101 and an image bus 102 that transfers image data at a high speed, and converts data structure. The image bus 102 includes a high speed bus such as peripheral component interconnect (PCI) bus or Institute of Electrical and Electronics Engineers (IEEE) 1394. On the image bus 102, the following devices are arranged. A public documentation license (PDL) accelerator 111 generates image data 800 (FIG. 8) from PDL codes. A device I/F unit 112 connects the scanner 200 and the printer 300 acting as an image input and an output devices, to the controller unit 100, and performs synchronous/asynchronous conversion of the image data.

An image compression unit 113 performs compression/decompression processing of multi-value image data by Joint Photographic Experts Group (JPEG), and of binary image data by Joint Bi-level Image Experts Group (JBIG), modified modified READ (MMR), and modified Huffman (MH). The image compression unit 113 reads out the image data to be compressed, or to be decompressed from the HDD 109, and stores them again in the HDD 109 after having performed the compression processing, or the decompression processing.

The FPGA 700 acts as a programmable logic device and rasterizes circuit configuration data that has image processing algorithms, and is provided with a function of configuring necessary image processing algorithms as hardware. In the present exemplary embodiment, a scanner image processing unit 500 (FIG. 6) and a printer image processing unit 600 (FIG. 7) are configured by rasterizing the circuit configuration data on the FPGA 700. In other words, the FPGA 700 includes a reconfiguration circuit, which enables reconfiguration according to the circuit configuration data stored in a flash memory 701, and executes image processing on the image data. The FPGA 700, on completing processing of one job, generates an EndFlag (details will be described below).

The flash memory (circuit configuration data memory (second storage unit)) 701 stores circuit configuration data 900 (FIG. 9) selected and acquired from the ROM 108 for rasterizing on the FPGA 700. The circuit configuration data 900 in the present exemplary embodiment corresponds to the circuit configuration data for configuring respective units of the scanner image processing unit 500 and the printer image processing unit 600.

A selector 702 controls a destination of register setting information transmitted from the CPU 103 to be either the FPGA 700 or the converter 703, based on a ChgFlag generated in the CPU 103 (details will be described below). Further, the selector 702 controls timing when transmitting the register setting information to the FPGA 700, based on the EndFlag generated in the FPGA 700 (details will be described below).

A converter 703 converts the register setting information received from the selector 702 into circuit configuration data alteration information. FIG. 2 illustrates a configuration in which the selector 702 and the converter 703 are mounted as the hardware. A means for mounting the selector 702 and the converter 703 may be either software or hardware. More specifically, the selector 702 and the converter 703 may be realized by causing the CPU 103 to read out and execute a program recorded in the ROM 108.

Figure 3:
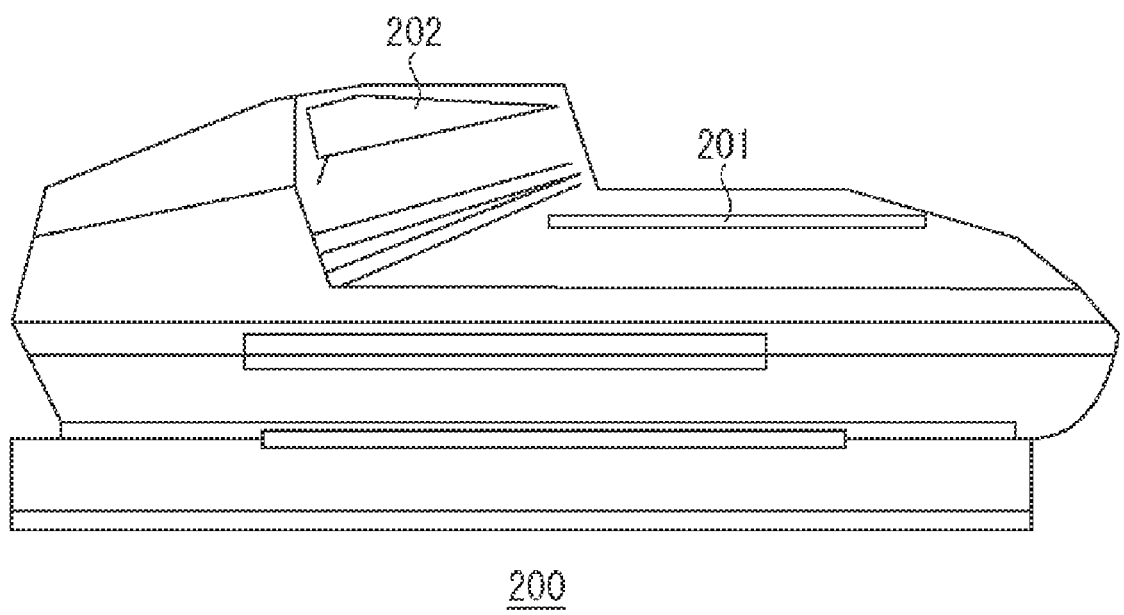
FIG. 3 is a general view illustrating a scanner serving as an image input unit.

FIG. 3 is a general view illustrating the scanner 200 acting as an image input unit illustrated in FIG. 2. The scanner 200 acting as the image input device optically reads out documents, and converts them into electric signals as raster image data, by illuminating sheets acting as documents with images, and scanning a charge-coupled device (CCD) line sensor (not illustrated). Hereinbelow, an operation of the scanner 200 will be described.

A user sets up document sheets on a tray 202 of a document feeder 201, and gives readout and activation instructions from the operation unit 400 so that the CPU 103 of the controller unit 100 gives instructions to the scanner 200. According to the instructions, in the scanner 200, the feeder 201 feeds document sheet one by one, and the CCD line sensor (not illustrated) performs document readout operation to read out document images.

Figure 4:
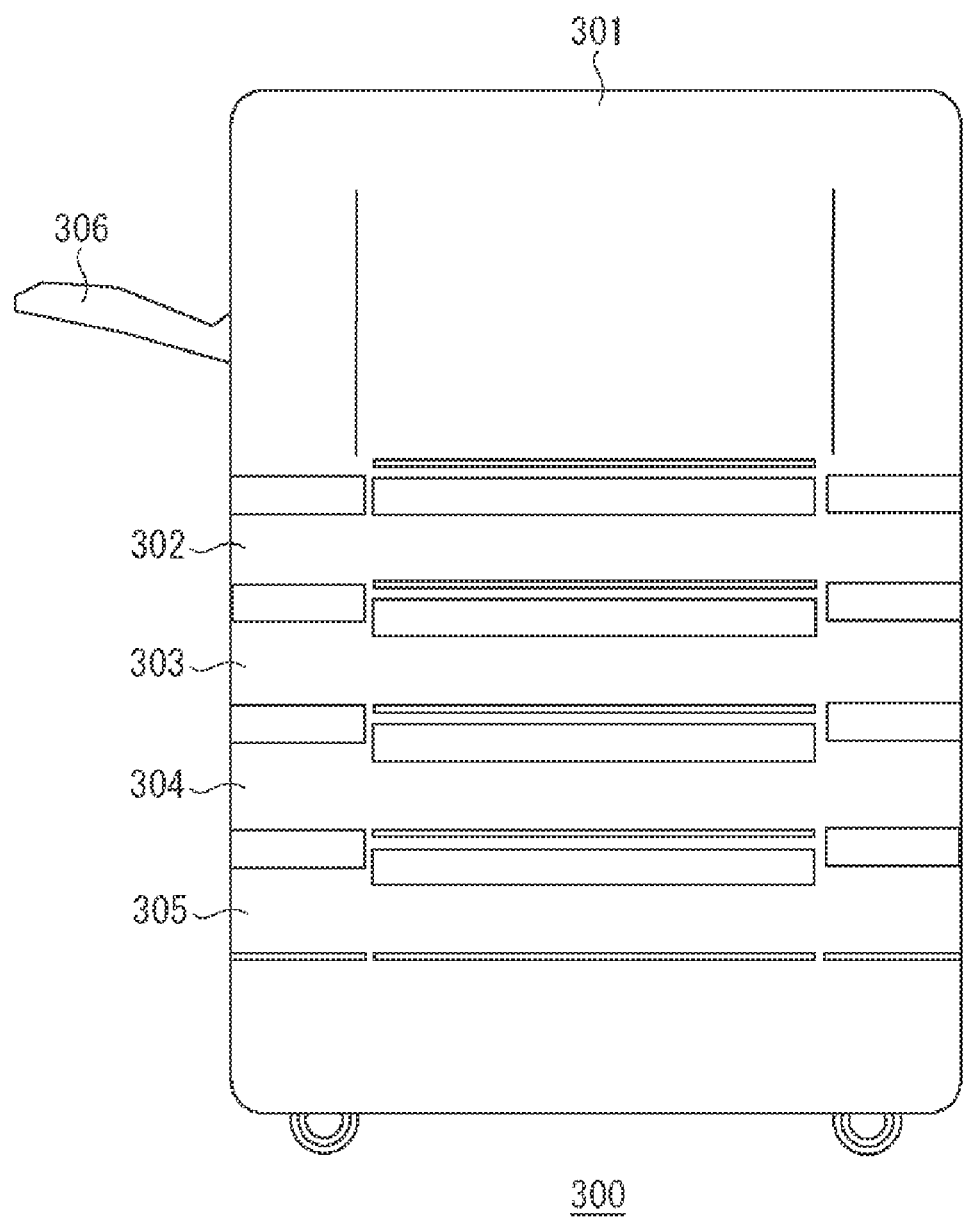
FIG. 4 is a general view illustrating a printer serving as an image output unit.
Figure 5:
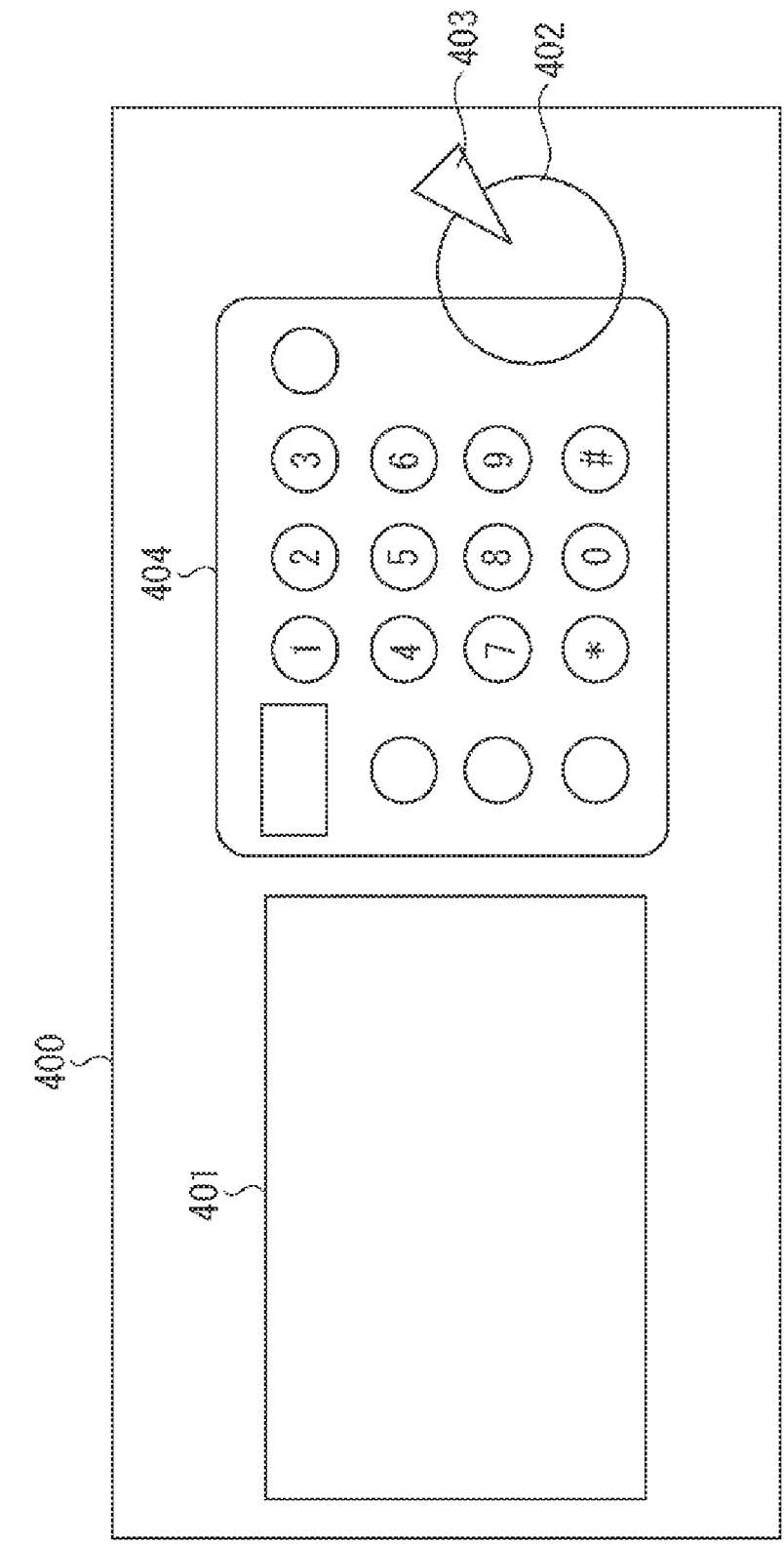
FIG. 5 is a plan view illustrating an example of a configuration of an operation unit.

FIG. 4 is a general view illustrating the printer 300 acting as an image output unit illustrated in FIG. 2. A printer 300 acting as an image output device is a portion which converts raster image data into images on sheets. The system includes an electrophotographic system using a photosensitive drum or a photosensitive belt, an inkjet system for ejecting ink from a fine nozzle array and directly printing the image on the sheets, and the like. However, any system is acceptable. Hereinbelow, operation of the printer 300 will be described.

An activation of print operation is started by an instruction of the CPU 103 of the controller unit 100. The printer 300 has a plurality of sheet feeding stages so that the user can select different sheet sizes or different sheet orientations, and sheet cassettes 302, 303, 304, and 305 compliant with these configurations are attached to the sheet feeding stages. Further, a sheet discharge tray 306 is used to receive sheets which have finished printing. Further, in this case, though not illustrated here, according to the instructions from the CPU 103 of the controller unit 100, it is also possible to sort out output sequences, to perform two-sided printing, to perform enlargement/reduction, and to perform bookbinding of output sheets by a staple device.

FIG. 5 is a plan view illustrating an example of a configuration of the operation unit 400 illustrated in FIG. 2. In FIG. 5, a liquid crystal operation panel 401 is a combination of a liquid crystal with a touch panel, and displays setting contents and a soft key or the like. A start key 402 is a hard key for giving instruction to start a copy operation, and green and red LEDs are incorporated therein. When start is enabled, the green LED lights up, and when start is disabled, the red LED lights up. A stop key 403 is a hard key to be used when stopping an operation. In the hard key group 404, a ten-digit key, a clear key, a reset key, a guide key, and a user mode key are provided.

Figure 6:
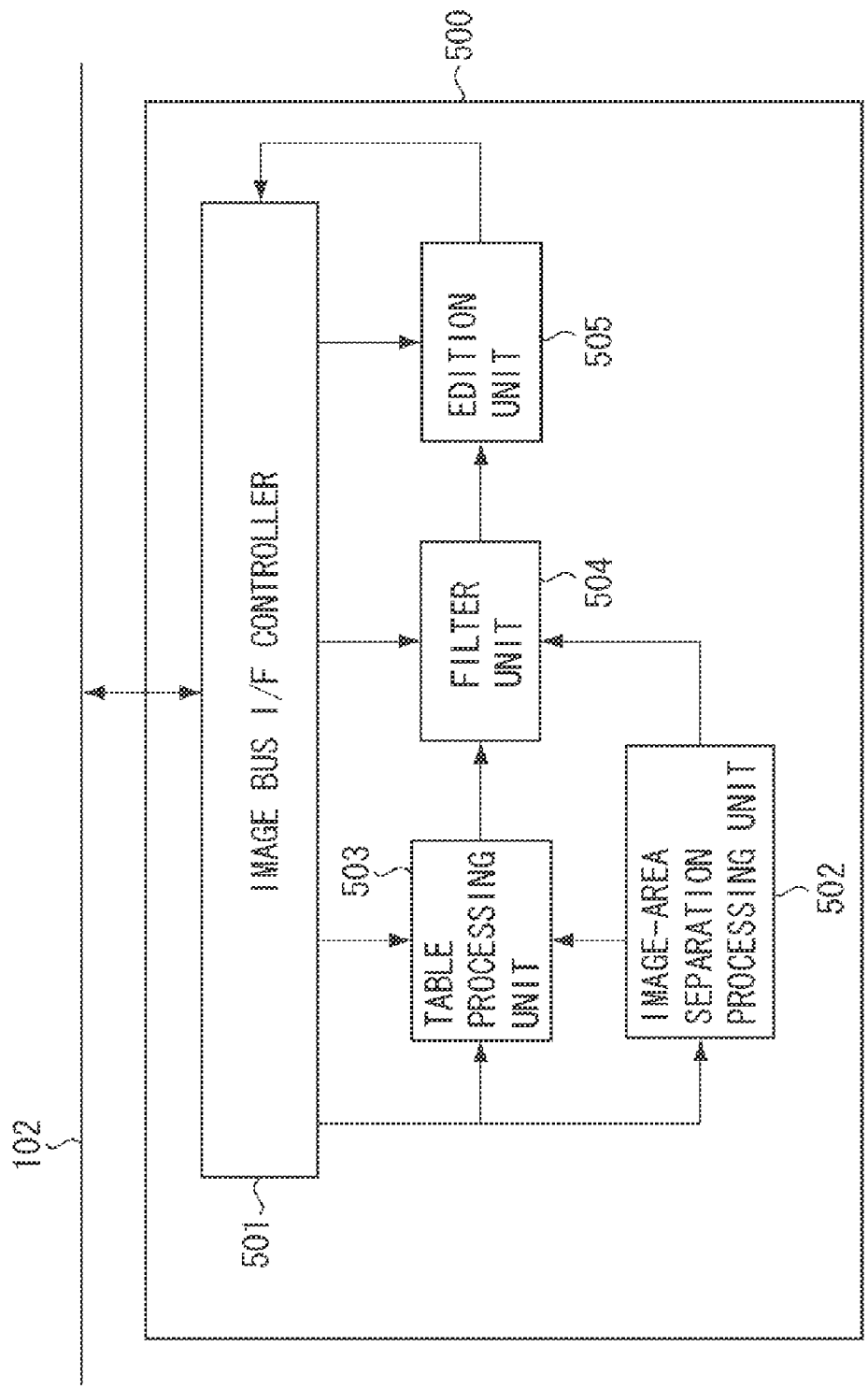
FIG. 6 illustrates an example of a configuration of a scanner image processing unit.

Hereinbelow, a function in which the FPGA 700 illustrated in FIG. 2 is configured as hardware by rasterizing circuit configuration data, will be described with reference to FIGS. 6 and 7. FIG. 6 illustrates an example of a configuration of a scanner image processing unit that is one of the functions in which the FPGA 700 illustrated in FIG. 2 is configured as the hardware by rasterizing the circuit configuration data. In FIG. 6, the scanner image processing unit 500 corresponds to a function in which the FPGA 700 is configured as the hardware by rasterizing the circuit configuration data. An image bus I/F controller 501 connects to the image bus 102, and controls a bus access sequence thereof. The image bus I/F controller 501 also controls respective devices within the scanner image processing unit 500 and generates their timing. An image-area separation processing unit 502 discriminates an image-area by detecting a character area, from an input image, and generates an image-area signal to be utilized for subsequent image processing.

A table processing unit 503 performs table conversion for converting image data, which is read out luminance data, into density data. A filter processing unit 504 performs convolution calculation using a digital space filter pursuant to purposes such as edge enhancement. An edition unit 505 recognizes, for example, a closed region surrounded by a marker pen from input image data, and performs image manipulation processing such as shadowing, half-tone dot meshing, negative/positive inversion, on image data within the closed region. The image data, which has been already processed, is transferred again onto the image bus 102 via the image I/F bus controller 501. The FPGA 700 realizes the functions of the scanner image processing unit 500 as described above as the hardware by rasterizing the circuit configuration data.

Figure 7:
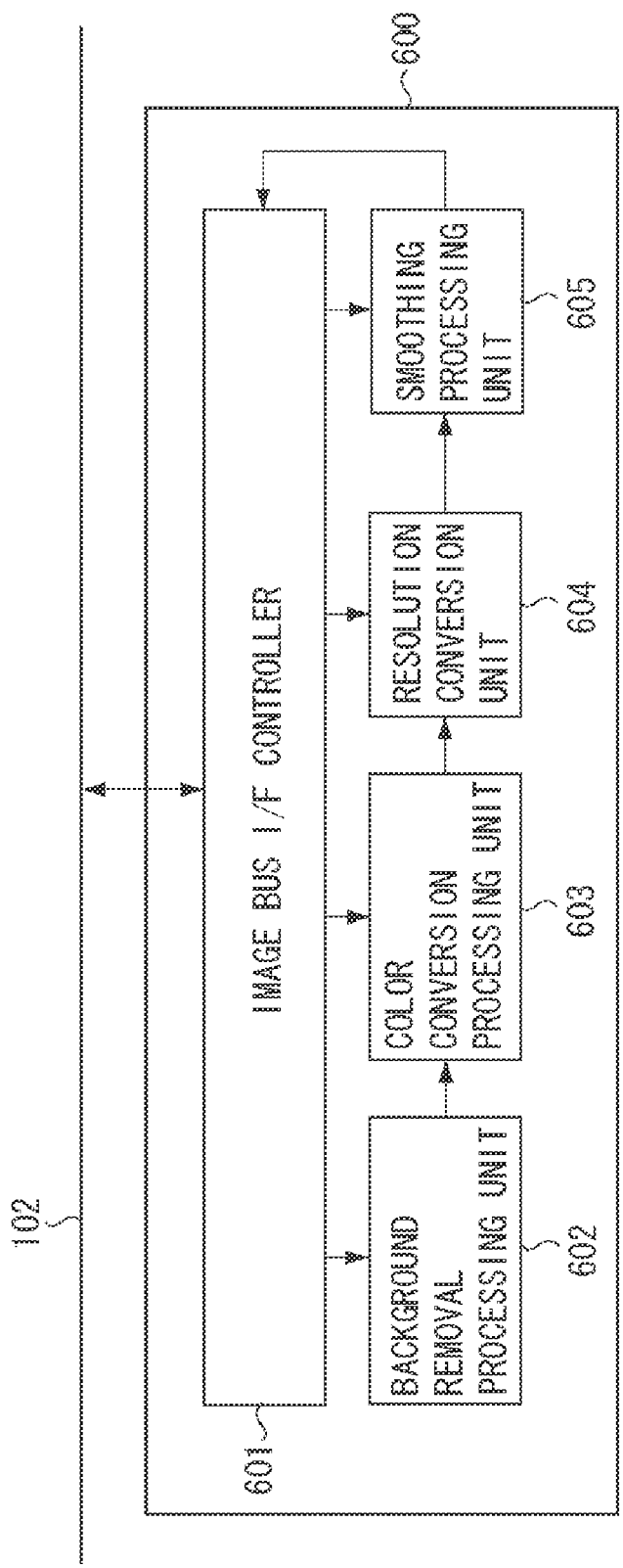
FIG. 7 illustrates an example of a configuration of a printer image processing unit.

FIG. 7 illustrates an example of a configuration of a printer image processing unit, which is one of the functions in which the FPGA 700 illustrated in FIG. 2 is realized as the hardware by rasterizing the circuit configuration data. In FIG. 7, a printer image processing unit 600 corresponds to a function in which the FPGA 700 is realized as the hardware by rasterizing the circuit configuration data. An image bus I/F controller 601 connects to the image bus 102, and controls a bus access sequence thereof. Further, the image bus I/F controller 601 controls respective devices within the printer image processing unit 600 and generates their timing. A background color removal processing unit 602 removes background color when image data that has readout a document in which there is a light color in its background, is received.

A color conversion processing unit 603 performs color conversion matched to output characteristics of the printer. A resolution conversion unit 604 performs resolution conversion for converting the image data received from the LAN 11 or the public line 12 into resolutions of the printer 300. In a screen processing unit (not illustrated) binarization processing is performed on the image data. A smoothing processing unit 605 performs processing for smoothing jaggies of the image data (jagged edges of an image appearing on white/black boundary such as diagonal lines) after the resolution conversion. The FPGA 700 realizes the functions of the printer image processing unit 600, as described above as the hardware, by rasterizing the circuit configuration data.

Figure 8:
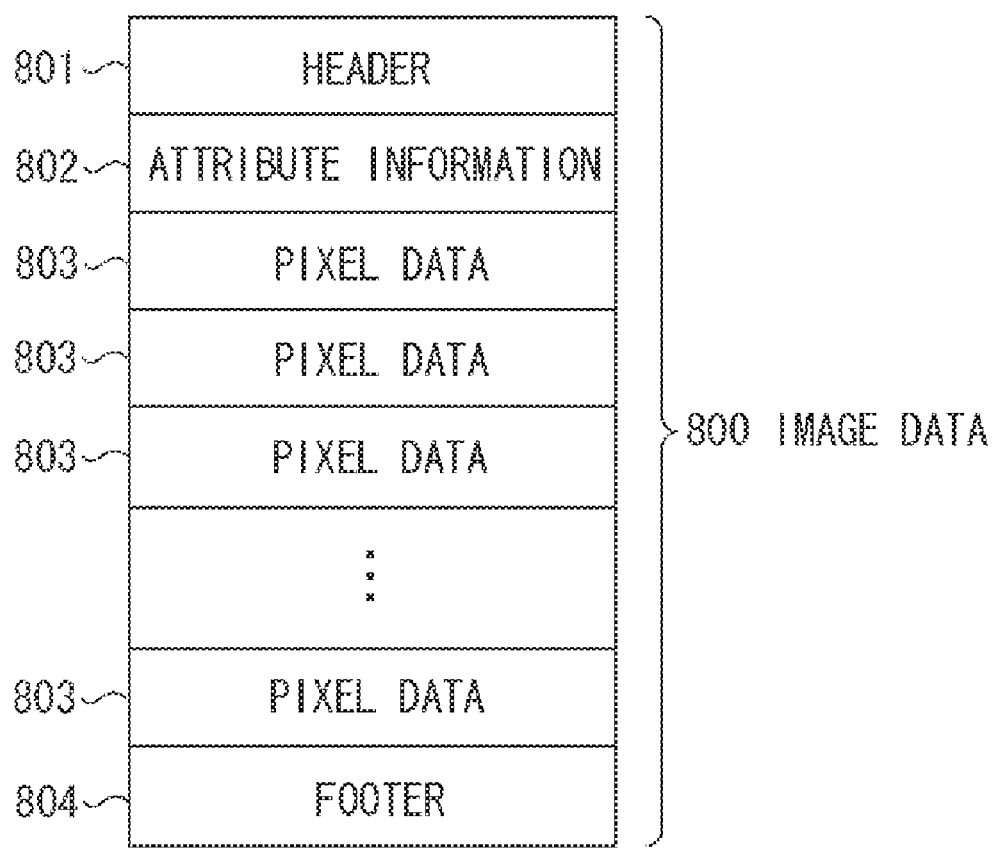
FIG. 8 is a diagram illustrating a configuration of image data in the present exemplary embodiment.

FIG. 8 is a data configuration diagram illustrating the configuration of the image data in the present exemplary embodiment. In FIG. 8, image data 800 includes a header 801, attribute information 802, a plurality of pixel data 803, and a footer 804. The header 801 includes a print job ID and a number of pages, information regarding length and width of the image data 800, and a start flag used for indicating a starting point of the image data 800. The attribute information 802 includes information regarding printing of images (image processing contents) such as colors, resolutions and print modes. The pixel data 803 includes image data for each pixel. The footer 804 includes an end flag used for indicating an end point of the image data 800.

Next, a configuration of circuit configuration data selected from the ROM 108 and stored in the flash memory 701, and rasterized on the FPGA 700 will be described with reference to FIG. 9. FIG. 9 illustrates the circuit configuration data in the present exemplary embodiment. In FIG. 9, the circuit configuration data 900 is selected from the ROM 108 and stored in the flash memory 701, and rasterized on the FPGA 700. In the present exemplary embodiment, data width of the circuit configuration data 900 is assumed to be T bits.

As illustrated in FIG. 9, the circuit configuration data 900 includes a header 901, a footer 902, and a plurality of wiring data 903. The header 901 includes a start flag used for indicating a starting point of the circuit configuration data 900, a circuit ID (circuit identification information) of the circuit configuration data 900, and the like. The circuit ID is identification information for discriminating the circuit configuration data 900, and corresponds to a circuit ID 1010 illustrated in FIG. 10 described below. The footer 902 has an end flag (EndFlag) used for indicating an end point of the circuit configuration data 900, and a boot flag used for booting the FPGA.

The wiring data 903 includes a start bit 904, an end bit and error check bit 905, and a wiring data bit 906. The start bit 904 (data width of 1-bit) is added to the head of the wiring data, and used for indicating the beginning of the wiring data. The end bit and error check bit 905 (data width of n-bits) is added to the end of the wiring data, and used for checking correctness of the wiring data and indicating the end of the wiring data. The wiring data bit 906 (data width of m-bits) is used for representing connection state between logic elements of the FPGA.

Next, a setting information generation table according to the present exemplary embodiment will be described with reference to FIG. 10. In FIG. 10, a setting information generation table 1000 is stored in the ROM 108 of the controller unit 100. The setting information generation table 1000 is a table for associating the circuit ID 1010 determined according to the attribute information 802 (image processing contents such as colors, resolutions, print modes, lightness, color saturations) that a user has set, with the register setting information table ID (register setting information table identification information) 1020.

The circuit ID 1010 is identification information for discriminating the circuit configuration data 900 to be rasterized on the FPGA 700, and corresponds to the circuit ID within the header 901 illustrated in FIG. 9. The register setting information table ID 1020 is identification information for discriminating the register setting information table 1100 stored in the ROM 108, as illustrated in FIG. 11.

Figure 11:
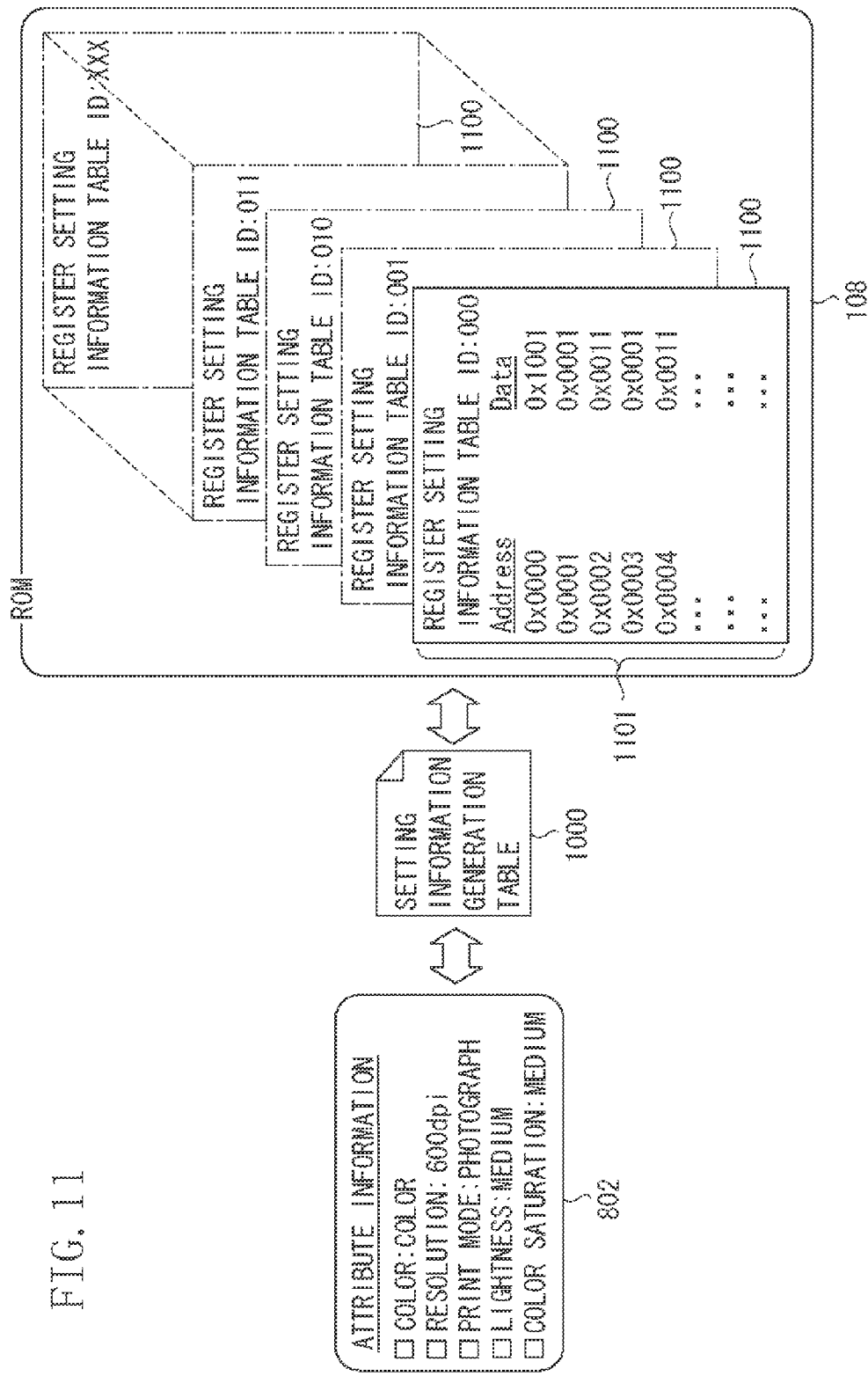
FIG. 11 illustrates a relationship between the setting information generation table and respective register setting information tables.

FIG. 11 illustrates a relationship between the setting information generation table 1000 illustrated in FIG. 10 and respective register setting information tables 1100 stored in the ROM 108. As illustrated in FIG. 11, in respective register setting information tables 1100 stored in the ROM 108, the register setting information table ID 1020, and the register setting information 1101 are stored.

The register setting information 1101 is information used for setting register values necessary for settings of coefficients and threshold values of image processing calculation, and includes addresses and data (details will be described below). More specifically, the register setting information 1101 according to the attribute information for each of attribute information (image processing content) is stored in the ROM 108.

Firstly, the CPU 103 acquires the register setting information table ID 1020 according to the attribute information 802 (e.g., colors, resolutions, print modes, lightness, color saturations) set for a print job, from the setting information generation table 1000. Then, the CPU 103 acquires the register setting information 1101 from the register setting information table 1100 corresponding to the acquired register setting information table ID 1020. The CPU 103 rewrites the wiring data 903 of the circuit configuration data 900 using the register setting information 1101 acquired here.

Figure 12:
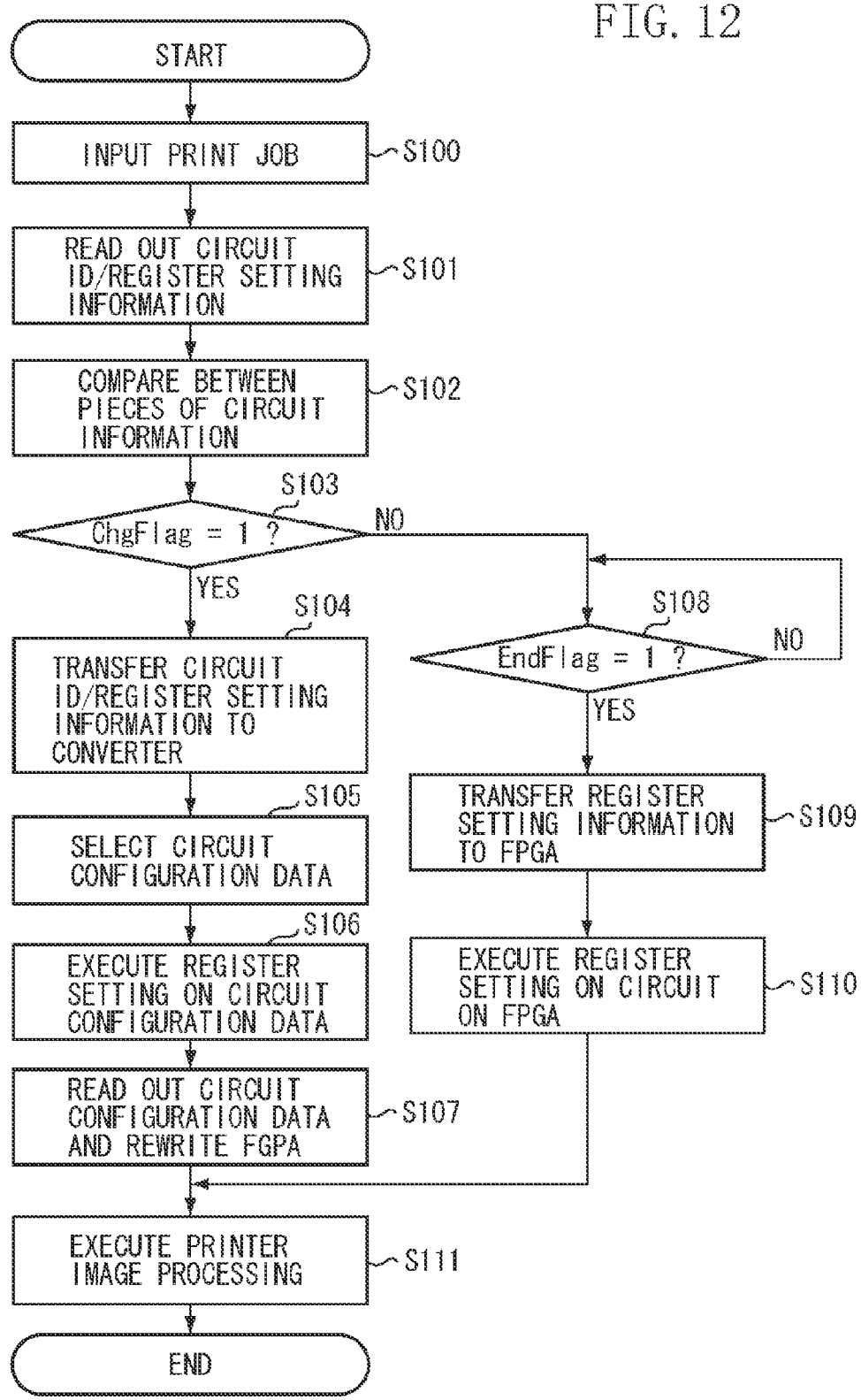
FIG. 12 is a flowchart illustrating processing in the first exemplary embodiment.

Next, a method for rasterizing the circuit configuration data 900 to the FPGA 700 and register setting in the first exemplary embodiment of the present invention will be described with reference to FIG. 12 to FIG. 15. FIG. 12 is a flowchart illustrating a method for rasterizing the circuit configuration data 900 to the FPGA 700 and register setting in the first exemplary embodiment of the present invention. The processing of the flowchart is realized by the controller unit 100 by causing the CPU 103 of the controller unit 100 to read out and execute a program recorded in the ROM 108.

Figure 13:
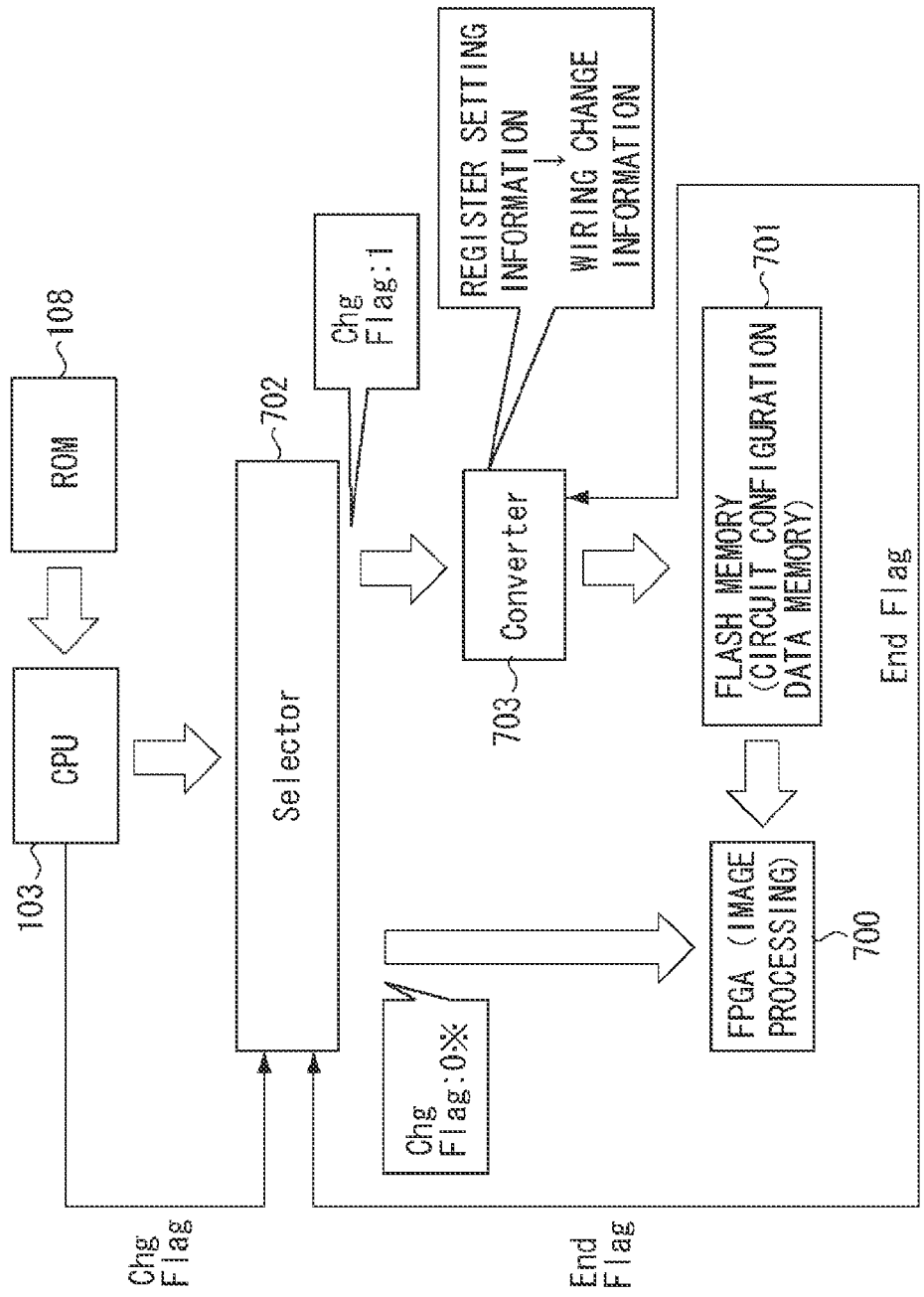
FIG. 13 illustrates a method for register setting in the present invention.

FIG. 13 illustrates a method for register setting in the present invention. Firstly, in step S100, when a print job is generated in the PC 10, and is input into the MFP 21 by way of the LAN 11, via the network I/F 105, the input print job is input into the PDL accelerator 111, and the image data 800 is generated.

Next, in step S101, the CPU 103 acquires the circuit ID 1010 and the register setting information table ID 1020 corresponding to the attribute information 802 within the image data 800, using the setting information generation table 1000 (FIG. 10) stored in the ROM 108. Furthermore, the CPU 103 reads out the register setting information 1101 from the register setting information table 1100 in the ROM 108 corresponding to the register setting information table ID 1020 and transfers them to the selector 702. The thus acquired circuit ID 1010 is transferred to the RAM 107.

Next, in step S102, the CPU 103 compares between the circuit ID 1010 read out in the above step S101, and the circuit ID within the circuit configuration data 900 previously rasterized on the FPGA 700. Based on the comparison result, the CPU 103 determines whether the circuit rewriting on the FPGA 700 is needed, generates a ChgFlag, and transfers it to the selector 702. If the circuit ID 1010 read out in the above step S101 is different from the circuit ID within the circuit configuration data 900 previously rasterized on the FPGA 700, the CPU 103 determines that the circuit rewriting on the FPGA 700 is needed, and generates '1' as the ChgFlag. On the other hand, if the circuit ID 1010 read out in the above step S101 is the same as the circuit ID within the circuit configuration data 900 previously rasterized on the FPGA 700, the CPU 103 determines that the circuit rewriting on the FPGA 700 is needed, and generates '0' as the ChgFlag.

In steps S103 and S108, the selector 702 controls destination of the register setting information 1101, as illustrated in FIG. 13, based on the above-described ChgFlag that the CPU 103 generates, and the EndFlag that the FPGA 700 generates. When processing relating to a job is performed, the FPGA 700 generates '0' as the EndFlag. When processing relating to a job is not performed, the FPGA 700 generates '1' as the EndFlag. More specifically, the EndFlag is used as a state decision signal for deciding whether the FPGA 700 is performing image processing.

If the ChgFlag is '0' (NO in step S103), and the EndFlag is '1' (YES in step S108), then in step S109, the selector 702 transmits the register setting information 1101 to the FPGA 700. In other words, if the circuit rewriting on the FPGA 700 is not needed, and processing is not performed in the FPGA 700, then in step 109, the selector 702 transmits the register setting information 1101 to the FPGA 700. In step S110, the FPGA 700 performs register setting on a circuit on the FPGA 700, according to the register setting information 1101. Accordingly, image processing of a printer job can be performed by the FPGA 700.

Further, if the ChgFlag is '0' (NO in step S103) and the EndFlag is '0' (NO in step S108), the selector 702 stores the register setting information 1101 inside the selector 702. In other words, if the circuit rewriting on the FPGA 700 is not needed, and processing relating to a job is performed in the FPGA 700, the selector 702 stores the register setting information 1101 inside the selector 702. Then, when the EndFlag becomes '1' (YES in step S108), that is, when processing relating to the job is completed in the FPGA 700, then in step S109, the selector 702 transmits the register setting information 1101 that the selector 702 has stored therein, to the FPGA 700. In step S110, in the FPGA 700, register setting is performed on the circuit on the FPGA 700, according to the register setting information 1101. Accordingly, image processing of the printer job by the FPGA 700 can be performed.

Further, if the ChgFlag is '1' (YES in step S103), then in step S104, the selector 702 transmits the register setting information 1101 to the converter 703, regardless of a value of the EndFlag. In other words, if the circuit rewriting on the FPGA 700 is needed, then in step S104, the selector 702 transmits the register setting information 1101 to the converter 703, regardless of whether processing is performed by the FPGA 700. Accordingly, in the converter 703, the register setting information 1101 can be converted into wiring alterations information. By the data conversion, the register setting information 1101 is converted into the wiring alterations information that is a data format for performing register setting, by rewriting wiring data 907 (FIG. 14) of a register portion of the circuit configuration data 900 in the flash memory 701. In the above step S104, the selector 702 also transfers a circuit ID to be stored in the RAM 107 to the converter 703.

Next, in step S105, the converter 703 selects the circuit configuration data 900 corresponding to the above-described transferred circuit ID 1010 as a rewriting target, and reads out the data 900 from the ROM 108 to keep the data stored in the flash memory 701.

Next, in step S106, the converter 703 performs data conversion of the register setting information 1101 into the wiring alterations information, and executes register setting for the circuit configuration data 900 in the flash memory 701 (first setting processing). More specifically, the converter 703 rewrites wiring data bit 908 (FIG. 15) concerning a register initial value, among the wiring data 907 (FIG. 14) of the register portion of the circuit configuration data 900 in the flash memory 701, according to the circuit configuration data alterations information that has been converted.

Figure 14:
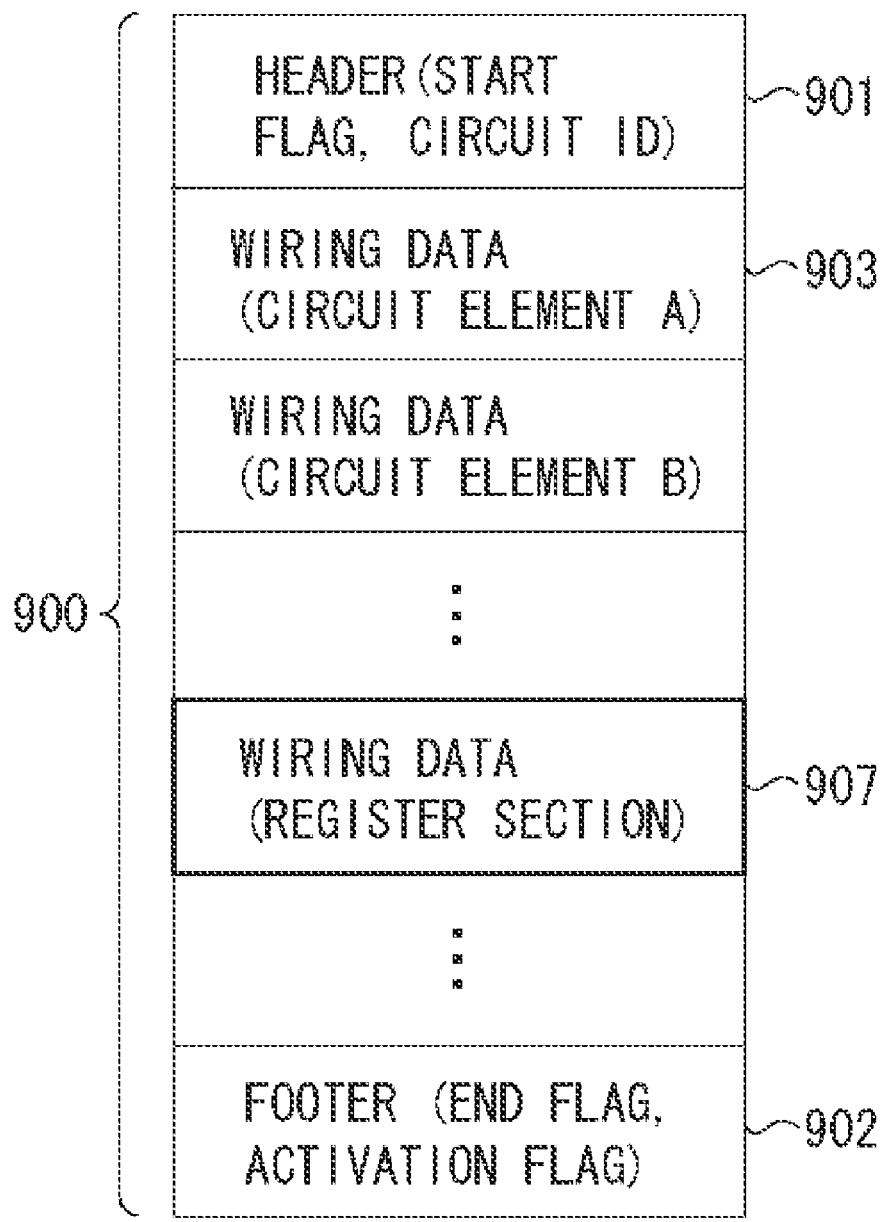
FIG. 14 illustrates wiring data of a register portion of circuit configuration data.
Figure 15:
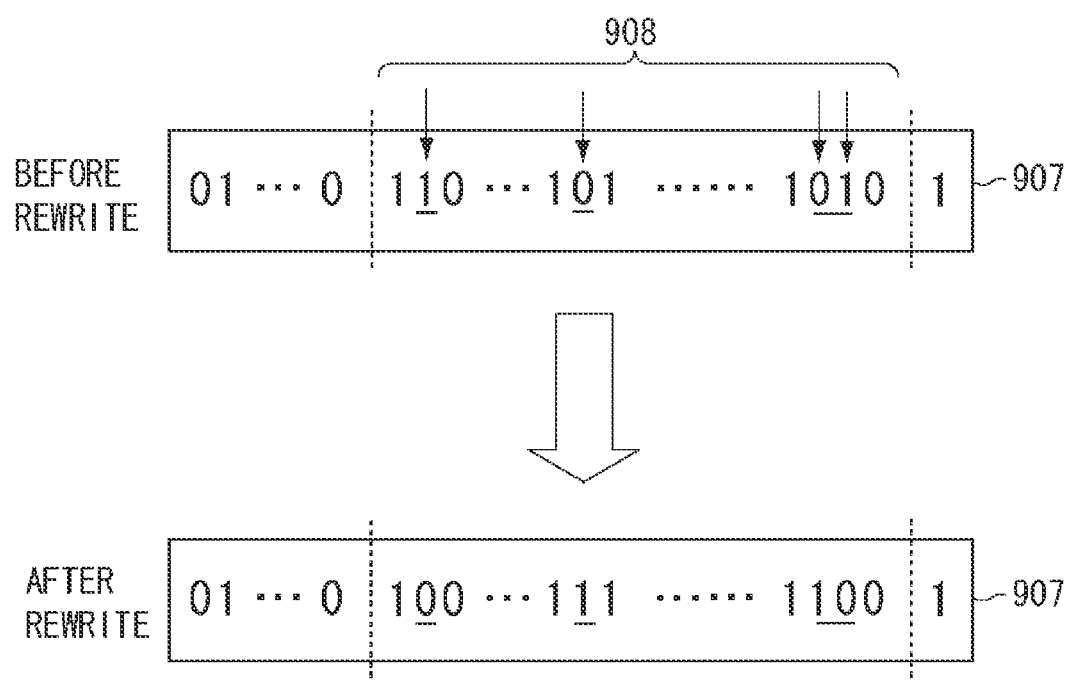
FIG. 15 illustrates rewriting wiring data of register portion.

Accordingly, since a desired register setting value is given to the circuit configuration data 900 as an initial value, the need to perform register setting will be eliminated, after the circuit configuration data 900 has been rasterized on the FPGA 700. FIG. 14 illustrates a register portion of the wiring data 907 of the circuit configuration data 900 illustrated in FIG. 9. FIG. 15 illustrates rewriting of the register portion of the wiring data 907 illustrated in FIG. 14.

Next, in step S107, the converter 703 rasterizes the circuit configuration data 900 on the flash memory 701, which has been rewritten in the above step S106, on the FPGA 700 in response to a rasterization request from the FPGA 700 (in a state where the lag is '1'). Accordingly, rewriting (configuration processing) of the FPGA 700 is performed. When the rewriting of the FPGA 700 is completed, the converter 703 notifies the CPU 103 thereof.

When processing of the above step S107 or the above step S110 is completed, then in step S111, the CPU 103 causes the FPGA 700 to execute printer image processing of the image data 800, and ends the processing. In the FPGA 700, when processing of the print job (printer image processing) is completed, the EndFlag which is a processing end flag is set to '1'.

Though not illustrated in the flowchart, in the above step S102, if it is determined that the circuit rewriting on the FPGA 700 is not needed, and there is no change in the register setting, then in step S111, the CPU 103 causes the FPGA 700 to execute printer image processing, just as it is. More specifically, in this case, neither circuit rewriting on the FPGA 700 nor change of register setting is performed. The processing of the flowchart illustrated in FIG. 12 is executed each time a print job is input. Therefore, if a next print job is input before image processing is completed, the processing of FIG. 12 will be executed in parallel, and registration setting of the circuit configuration data corresponding to the next print job will be made on the flash memory 701 during the image processing of the preceding print job.

As described above, according to the present exemplary embodiment, during the processing of the print job, a register setting relating to the next print job can be performed on the circuit configuration data 900 in the flash memory 701. Therefore, since the need to perform register setting on the circuit on the FPGA 700 is eliminated, after the circuit configuration data 900 has been rasterized on the FPGA 700, a time interval between the print jobs can be shortened.

In the present exemplary embodiment, in the case of print job where color pages and monochrome pages are mixed, the attribute information 802 within the image data 800 is to be attributes of color. Further, processing of the flowchart illustrated in the above FIG. 12 may be executed page by page. Further, processing of the flowchart illustrated in the above FIG. 12 may be executed, each time the attribute information 802 within the image data 800 is changed.

Figure 16:
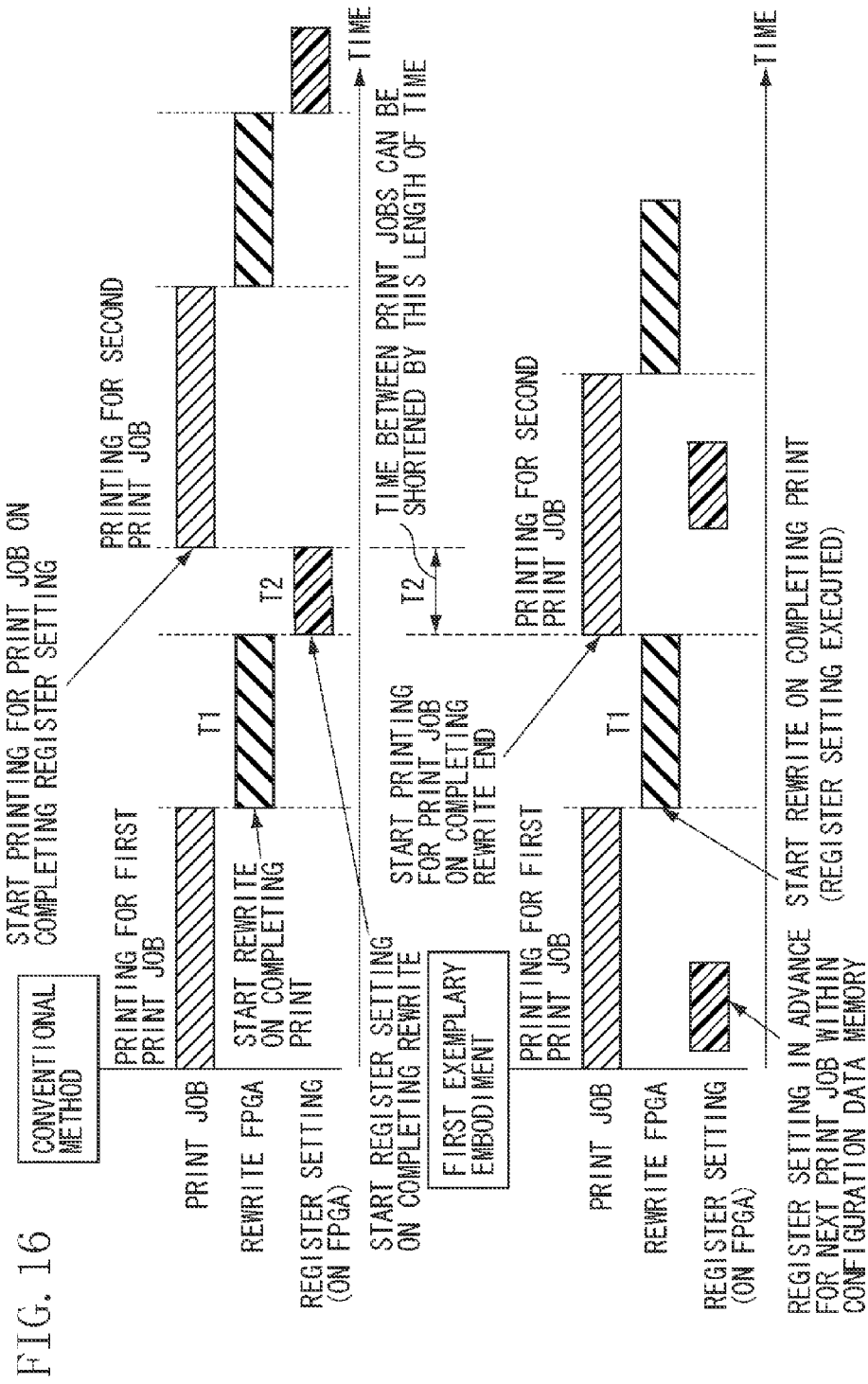
FIG. 16 illustrates the effects of the first exemplary embodiment.

Hereinbelow, the effects of the present exemplary embodiment of the present invention will be described with reference to FIG. 16. As illustrated in FIG. 16, conventionally, the FPGA for a second print job is rewritten only after printing of a first print job has been completed. After that, register setting is performed on the FPGA, and the second printing of the second print job is started.

On the other hand, in the present exemplary embodiment, during printing operation of the first print job, by performing register setting on the flash memory 701 for the second print job, the printing operation of the second print job can be started immediately after the completion of rewriting of the FPGA 700. Hence, in the present exemplary embodiment, compared with conventional method, time interval between the print jobs can be shortened, and the start of printing of the second print job can be advanced. In the present exemplary embodiment, the circuit configuration data 900, and the register setting information table 1100 are stored in the ROM 108, but each may be stored in different storage devices.

In the above-described first exemplary embodiment, a configuration has been described, in which, if the circuit rewriting on the FPGA 700 is needed, once register setting has been performed on the flash memory 701, the rewriting of the FPGA 700 is performed. In the present exemplary embodiment, if the circuit rewriting on the FPGA 700 is needed, a time required to perform the register setting on the flash memory 701, and a time required to perform the register setting on the FPGA 700 are compared with each other. Then, a method for enabling register setting in a shorter time is selected and used based on a comparison result.

Figure 17:
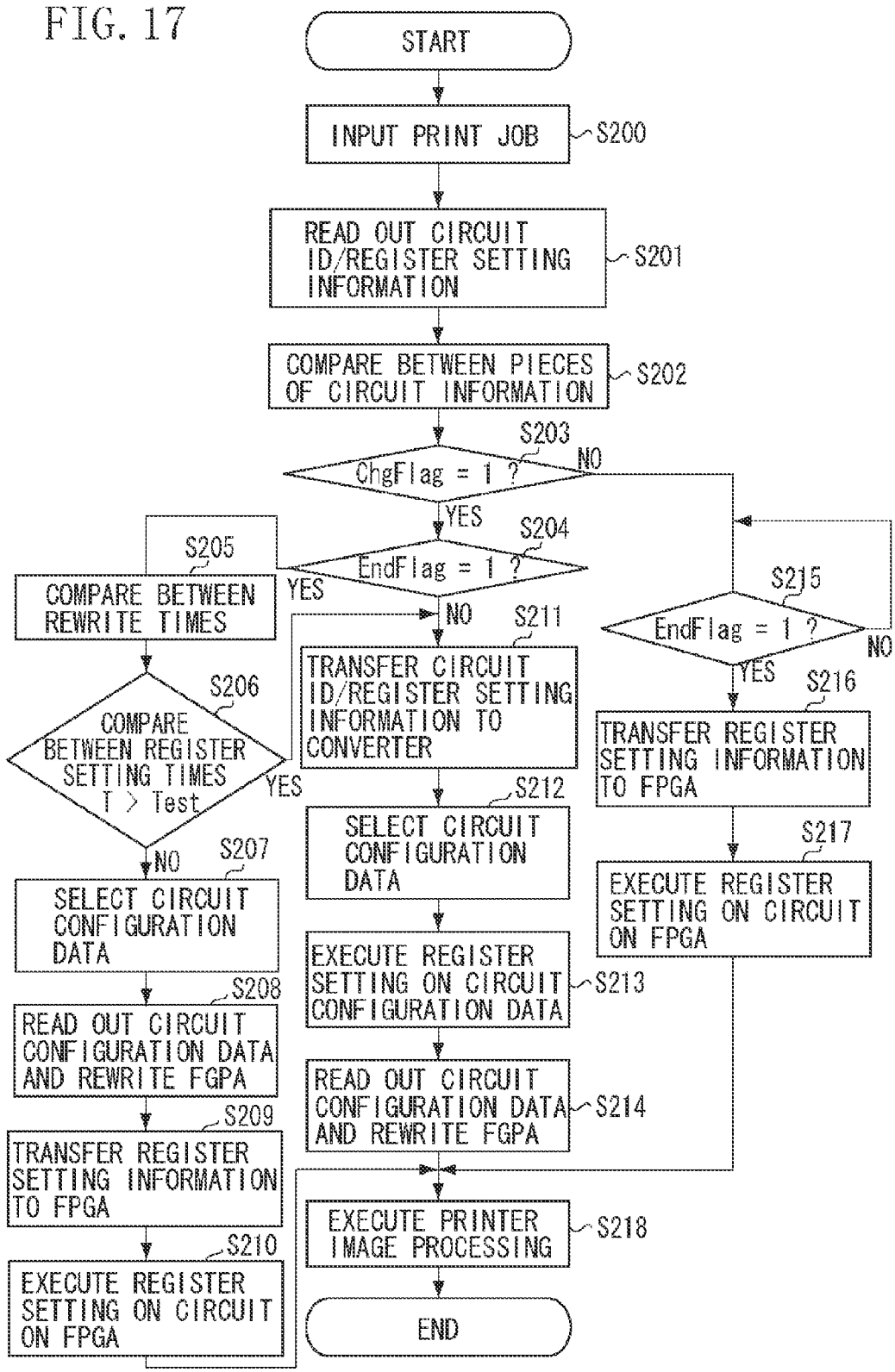
FIG. 17 is a flowchart illustrating processing in a second exemplary embodiment.

Hereinbelow, a method for rasterization of the circuit configuration data 900 to the FPGA 700 and register setting in the second exemplary embodiment of the present invention will be described with reference to FIG. 17. FIG. 17 is a flowchart illustrating a method for rasterization of the circuit configuration data 900 to the FPGA 700 and register setting in the second exemplary embodiment of the present invention. The processing of the flowchart is realized by the controller unit 100 by causing the CPU 103 of the controller unit 100 to read out and execute a program recorded in the ROM 108.

Firstly, the processing illustrated in steps S200 to S202 are similar to the processing illustrated in steps S100 to S102 in FIG. 12, respectively, and, as such, description thereof will be omitted. Next, in steps S203 to S206, the selector 702 controls destination of register setting information 1101, based on the ChgFlag, the EndFlag, and a result of comparison between a register setting time on FPGA T and a register setting time on memory Tset described below. The register setting time on FPGA T (second setting time) indicates a time required to perform register setting on a circuit on the FPGA 700, and is calculated based on a register scale to be set (data amount of the register setting information 1101 to be set). Further, a register setting time on memory Tset (first setting time) indicates a time required to perform register setting by rewriting the circuit configuration data 900 within the flash memory

701. The register setting time on memory Tset is the one which has been preset and stored in the ROM 108.

Firstly, if the ChgFlag is '0' (NO in step S203), the processing illustrated in steps S215 to S217 are executed. The processing in steps S215 to S217 is similar to the processing illustrated in steps S108 to S110 in FIG. 12, respectively, and, as such, descriptions thereof will be omitted. Further, if the ChgFlag is '1' (YES in step S203) and the EndFlag is '0' (NO in step S204), the processing illustrated in steps S211 to S214 is executed. In this case, although the circuit rewriting on the FPGA 700 is needed, the FPGA 700 is performing job processing, and the circuit rewriting on the FPGA 700 cannot be immediately performed. Therefore, once register setting has been performed on the flash memory 701, the rewriting of the FPGA 700 is performed after waiting for the completion of processing in the FPGA 700. The processing in steps S211 to S214 are similar to the processing illustrated in steps S104 to S107 in FIG. 12, respectively, and, as such, descriptions thereof will be omitted.

Further, if the ChgFlag is '1' (YES in step S203) and the EndFlag is '1' (YES in step S204), the processing illustrated in steps S205 to S210 are executed. In this case, the circuit rewriting on the FPGA 700 is needed. Since the FPGA 700 is not performing job processing, the circuit rewriting on the FPGA 700 can be performed immediately. Hereinbelow, descriptions will be given in detail.

Firstly, in step S205, the selector 702 calculates a register setting time on FPGA T according to the register setting information 1101 to be set, and compares the calculated register setting time on FPGA T and a register setting time on memory Tset that has been set in advance. Then, if the register setting time on FPGA T is longer than the register setting time on memory Tset (T>Tset) (YES in step S206), then in step S211, the selector 702 transmits the circuit ID to be stored in the RAM 107 and the register setting information 1101, to the converter 703. Hereinbelow, the processing of the steps S212 to S214 described above will be executed.

On the other hand, if the register setting time on FPGA T is shorter than the register setting time on memory Tset (when T≦Tset) (NO in step S206), the selector 702 stores the register setting information inside the selector 702.

Next, in step S207, the selector 702 selects the circuit configuration data 900 corresponding to the circuit ID to be stored in the RAM 107 as a rewriting target, and reads out the data 900 from the ROM 108 to store it in the flash memory 701. Next, in step S208, the selector 702 rasterizes the circuit configuration data 900 on the flash memory 701 selected in the above step S207, on the FPGA 700. Accordingly, the rewriting (reconfiguration processing) of the FPGA 700 is performed.

Next, in step S209, the selector 702 transmits the register setting information 1101 stored inside the selector 702 to the FPGA 700. In step S210, the FPGA 700 performs register setting (second setting processing) on the circuit on the FPGA 700, according to the register setting information 1101. Accordingly, image processing of a printer job through the FPGA 700 becomes possible.

When the processing in the above steps S210, S214, or S217 is completed, in step S218, the CPU 103 causes the FPGA 700 to execute printer image processing of the image data 800, and ends the processing. In the FPGA 700, when the processing of the print job (printer image processing) is completed, the CPU 103 sets the EndFlag, which is a processing end flag, to '1'.

Though not illustrated in the flowchart, in the above step S202, if it is determined that circuit rewriting on the FPGA 700 is not needed, and there is no change of the register setting, then in step S218, the CPU 103 causes the FPGA 700 to execute the printer image processing. More specifically, in this case, neither circuit rewriting on the FPGA 700 nor change of the register setting is performed.

The processing of the flowchart illustrated in FIG. 17 is to be executed each time a print job is input. Therefore, in the case where a next print job is input before image processing is completed, the processing in FIG. 17 are executed in parallel, and the register setting of the circuit configuration data corresponding to the next print job is performed on the flash memory 701, while the image processing of the preceding print job is being performed.

According to the present exemplary embodiment, as described above, a method for register setting relating to the next print job can be switched, based on a result of comparison between the register setting time on FPGA T and the register setting time on memory Tset, while the print job is not being processed. Therefore, a method for the register setting can be performed, which enables setting in a shorter time, and a time until image processing is started can be made shortest.

In the present exemplary embodiment, in the case of a print job where color pages and monochrome pages are mixed, attribute information 802 within the image data 800 becomes attributes of color. Further, the processing of the flowchart illustrated in the above FIG. 17 may be executed page by page. Further, the processing of the flowchart illustrated in the above FIG. 17 may be executed each time the attribute information 802 within the image data 800 is changed.

Figure 18:
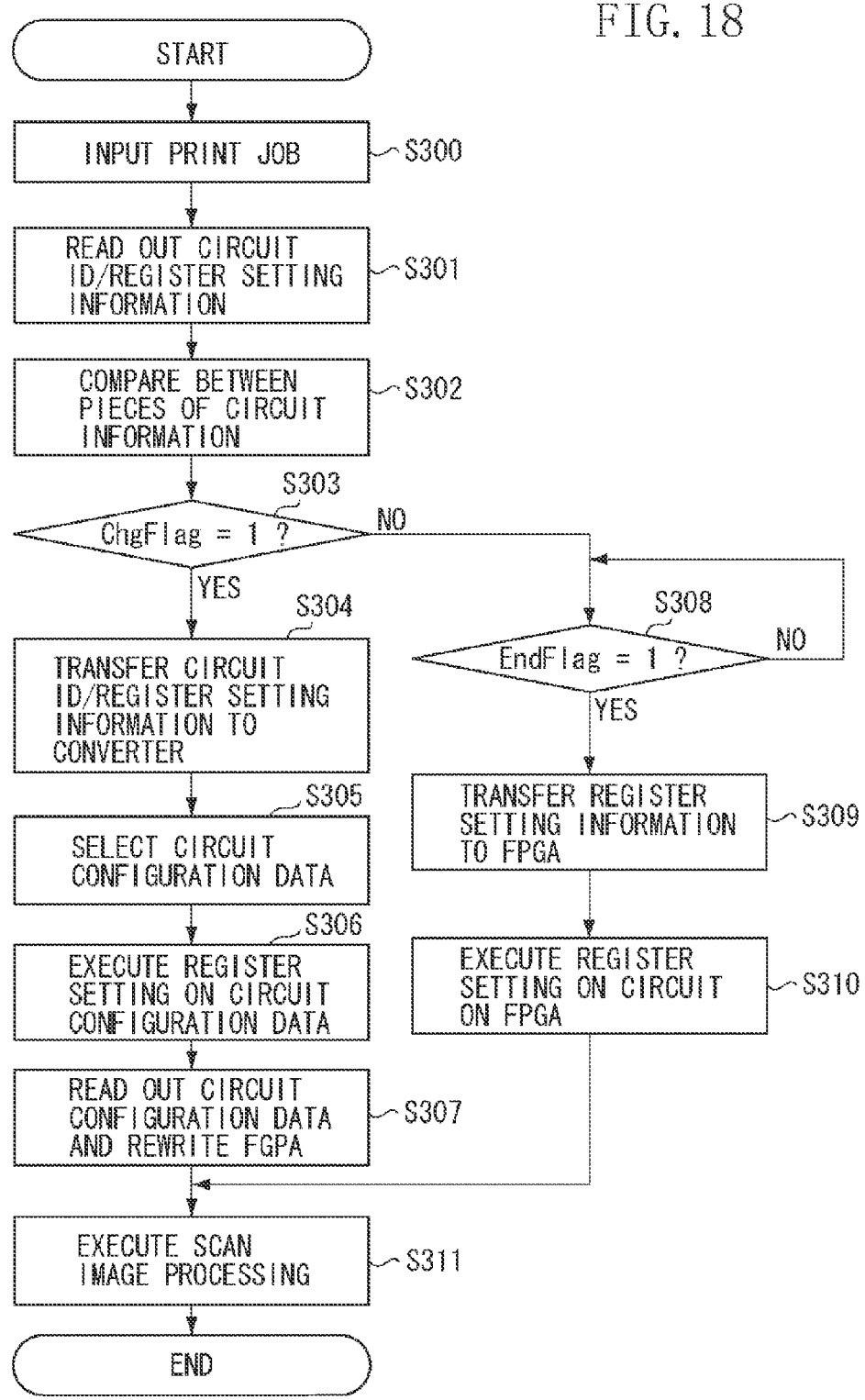
FIG. 18 is a flowchart illustrating processing in a third exemplary embodiment.

In the above-described first and second exemplary embodiments, a method for register setting when a print job is input into the MFP 21 has been described, but in the present third exemplary embodiment, a method for register setting when a scan job is input into the MFP 21 will be described. FIG. 18 is a flowchart illustrating a method for rasterization of the circuit configuration data 900 to the FPGA 700 and register setting in the third exemplary embodiment of the present invention. The processing of the flowchart is realized by the controller unit 100 by causing the CPU 103 of the controller unit 100 to read out and execute a program recorded in the ROM 108.

Firstly, in step S300, when a scan job is input, the CPU 103 causes a scanner portion 200 to scan a document, and the scanned image data 800 is input via the device I/F unit 112. Next, in step S301, the CPU 103 acquires the circuit ID 1010 and the register setting information table ID 1020 corresponding to the attribute information 802 within the image data 800, using the setting information generation table 1000 (FIG. 10) stored within the ROM 108. Furthermore, the CPU 103 reads out the register setting information 1101 from the register setting information table 1100 in the ROM 108 corresponding to the register setting information table ID 1020 and transfers them to the selector 702. The thus acquired circuit ID 1010 is transferred to the RAM 107.

Next, in step S302, the CPU 103 compares the circuit ID 1010 read out in the above step S301, and the circuit ID within the circuit configuration data 900 previously rasterized on the FPGA 700. Based on a result of the comparison, the CPU 103 determines whether the circuit rewriting on the FPGA 700 is needed, generates a ChgFlag, and transfers it to the selector 702. If the circuit ID 1010 read out in the above step S301, and the circuit ID within the circuit configuration data 900 previously rasterized on the FPGA 700 are different from each other, the CPU 103 determines that the circuit rewriting on the FPGA 700 is needed, and generates '1' as the ChgFlag. On the other hand, if the circuit ID 1010 read out in the above step S301 is the same as the circuit ID within the circuit configuration data 900 previously rasterized on the FPGA 700, the CPU 103 determines that the circuit rewriting on the FPGA 700 is not needed, and generates '0' as the ChgFlag.

In steps S303 and S308, the selector 702 controls destination of the register setting information 1101, based on the above ChgFlag that the CPU 103 generates, and the EndFlag that the FPGA 700 generates, as illustrated in FIG. 13. The FPGA 700 generates '0' as the EndFlag when the processing relating to a job is being performed, and generates '1' as the EndFlag when the processing relating to a job is not being performed.

If the ChgFlag is '0' (NO in step S303) and the EndFlag is '1' (YES in step S308), then in step S309, the selector 702 transmits the register setting information 1101 to the FPGA 700. More specifically, if the circuit rewriting on the FPGA 700 is not needed, and the processing is not being performed in the FPGA 700, then in step S309, the selector 702 transmits the register setting information 1101 to the FPGA 700. In step S310, the FPGA 700 performs register setting on a circuit on the FPGA 700, according to the register setting information 1101. Accordingly, the image processing of the scan job by the FPGA 700 becomes possible.

Further, if the ChgFlag is '0' (NO in step S303) and the EndFlag is '0' (NO in step S308), the selector 702 stores the register setting information 1101 inside the selector 702. More specifically, if the circuit rewriting on the FPGA 700 is not needed, and the processing relating to a job is being performed in the FPGA 700, the selector 702 stores the register setting information 1101 inside the selector 702. Then, when the EndFlag becomes '1' (YES in step S308), in other words, if the processing relating to the job is completed in the FPGA 700, then in step S309, the selector 702 transmits the register setting information 1101 stored inside the selector 702 to the FPGA 700. In step S310, in the FPGA 700, the selector 702 performs register setting on a circuit on the FPGA 700, according to the register setting information 1101. Accordingly, the image processing of the scan job by the FPGA 700 becomes possible.

Further, if the ChgFlag is '1' (YES in step S03), then in step S304, the selector 702 transmits the register setting information 1101 to the converter 703, regardless of a value of the EndFlag. More specifically, if the circuit rewriting on the FPGA 700 is needed, then in step S304, the selector 702 transmits the register setting information 1101 to the converter 703, regardless of whether processing is being performed in the FPGA 700. Accordingly, in the converter 703, the register setting information 1101 is converted into wiring alterations information. By the data conversion, the register setting information 1101 is converted into the wiring alterations information, which is a data format for performing register setting, by rewriting the wiring data 907 (FIG. 14) of the register portion of the circuit configuration data 900 within the flash memory 701. In the above step S304, the selector 702 also transfers the circuit ID stored in the RAM 107 to the converter 703.

Next, in step S305, the converter 703 selects the circuit configuration data 900 corresponding to the above-described transferred circuit ID 1010 as a rewriting target, reads out the data 900 from the ROM 108 to store it in the flash memory 701.

Next, in step S306, the converter 703 executes register setting on the circuit configuration data 900 within the flash memory 701. More specifically, the converter 703, according to the above circuit configuration data alterations information that has been converted, rewrites wiring data bit 908 (FIG. 15) concerning a register initial value, among the wiring data 907 (FIG. 14) of the register portion of the circuit configuration data 900 within the flash memory 701. Accordingly, a desired register setting value is given to the circuit configuration data 900 as an initial value, and the need to perform register setting will be eliminated after the circuit configuration data 900 has been rasterized on the FPGA 700.

Next, in step S307, the converter 703 reads out the circuit configuration data 900 on the flash memory 701 rewritten in the above step S106, in response to a rasterization request from the FPGA 700 (in a state where the EndFlag is set to '1'), and rasterizes the data 900 on the FPGA 700. Accordingly, the rewriting of the FPGA 700 (reconfiguration processing) is performed. The converter 703, on completion of the rewriting of the FPGA 700, notifies the CPU 103 thereof.

When the processing of the above steps S307 or S310 is completed, in step S311, the CPU 103 causes the FPGA 700 to execute scanning image processing of the image data 800, and ends the processing. In the FPGA 700, when processing of a scan job (scanning image processing) is completed, the EndFlag that is a processing end flag is set to '1'.

Though not illustrated in the flowchart, in the above step S302, if it is determined that the circuit rewriting on the FPGA 700 is not needed, and there is no change of register setting, then in step S311, the CPU 103 causes the FPGA 700 to execute scanning image processing. More specifically, in this case, neither circuit rewriting on the FPGA 700 nor change of register setting is performed.

The processing of the flowchart illustrated in FIG. 18 is to be executed each time a scan job is input. Therefore, if a next scan job is input before the image processing is completed, the processing of FIG. 18 is executed in parallel. Then, register setting of the circuit configuration data corresponding to the next scan job is performed on the flash memory 701, while the image processing of the preceding scan job is being performed.

As described above, according to the present exemplary embodiment, while the scan job is being processed, the register setting relating to the next scan job can be performed for the circuit configuration data 900 within the flash memory 701. Therefore, since the need to perform register setting on a circuit on the FPGA 700 is eliminated, after the circuit configuration data 900 on the FPGA 700 has been rasterized, time interval between the scan jobs can be shortened.

In the present exemplary embodiment, in the case of the scan job where color pages and monochrome pages are mixed, the attribute information 802 within the image data 800 becomes attributes of color. Further, the processing of the flowchart illustrated in the above FIG. 18 may be executed page by page. Further, the processing of the flowchart illustrated in the above FIG. 18 may be executed each time the attribute information 802 within the image data 800 is changed.

The processing (FIG. 17) for a print job described in the second exemplary embodiment may be applied to a scan job. More specifically, the circuit rewriting on the FPGA 700 is also needed, even when the scan job has been input. When the FPGA is not processing a job, a method for register setting relating to the scan job is switched based on a result of comparison between the above-described T and Tset. When T>Tset, after having performed register setting on the flash memory 701, the rewriting of the FPGA 700 is performed. On the other hand, when T≦Tset, the register setting is performed on the FPGA 700 after the rewriting of the FPGA 700 has been performed. In such a configuration, register setting can be achieved while setting can be set in a shorter time, and a time taken until the image processing of the scan job is started can be made shortest.

Configurations and contents of various data described above are not limited to the described ones, but the data is formed in a variety of configurations and contents depending on applications and purposes. Hereinabove, the first exemplary embodiment has been described, but an exemplary embodiment of the present invention can be, for example, a system, an apparatus, a method, a program or a storage medium or the like. More specifically, the present invention may be applied to a system including a plurality of devices, alternatively, may be applied to an apparatus including one device.

In respective exemplary embodiments described above, a configuration has been described in which a plurality of circuit configuration data is stored in the ROM 108, and necessary circuit configuration data is selected depending on a job, stored in the flash memory 701, rewritten in part on the flash memory 701, and subsequently rasterized to the FPGA 700. Alternatively, a plurality of circuit configuration data may be stored in the flash memory 701, and necessary circuit configuration data is selected depending on a job, rewritten in part on the flash memory 701, and subsequently rasterized to the FPGA 700, may be acceptable.

As described above, even when the FPGA is rewritten between the processing, register setting for a next processing can be performed on the flash memory 701. As a result, a long time is not needed between the processing. Hence, degradation of performance associated with reconfiguration of circuit can be suppressed.

The functions illustrated in FIG. 12, FIG. 17, and FIG. 18 in the present exemplary embodiment may be implemented by a computer with a processor, using a program that is externally installed. Then, in this case, even when information group including a program is supplied to an output device, by a storage medium such as a compact disc read-only memory (CD-ROM) or a flash memory or a floppy disc (FD), or from external storage medium via a network, the present invention can be applied.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-052316 filed Mar. 5, 2009, which is hereby incorporated by reference herein in its entirety.

What is claimed is:

1. An image processing apparatus comprising:
an input unit configured to input image data and image processing content to be executed on the image data;
a first storage unit configured to store a plurality of circuit configuration data;
a selection unit configured to select any one of the plurality of circuit configuration data stored in the first storage unit;
a second storage unit configured to acquire and store the circuit configuration data selected by the selection unit from the first storage unit;
an image processing unit configured to include a reconfiguration circuit, which enables reconfiguration according to the circuit configuration data stored in the second storage unit, and to execute image processing on image data input by the input unit;
a generation unit configured to generate rewriting data for rewriting the circuit configuration data stored in the second storage unit, based on the image processing content input by the input unit;
a control unit, after performing a first setting processing for rewriting a part of the circuit configuration data stored in the second storage unit, according to the rewriting data generated by the generation unit, configured to execute control to perform reconfiguration processing for reconfiguring a circuit configuration of the image processing unit according to the circuit configuration data stored by the second storage unit; and
a decision unit configured to decide whether the image processing unit is performing image processing,
wherein the control unit, if it is decided by the decision unit that image processing unit is performing image processing, executes control to perform the reconfiguration processing after performing the first setting processing, and to perform the reconfiguration processing upon a completion of image processing by the image processing unit.

2. The image processing apparatus according to claim 1, further comprising:
a comparison unit, if it is decided by the decision unit that the image processing unit is not performing image processing, configured to compare a first setting time required for the first setting processing, and a second setting time required for a second setting processing for setting the image processing content for the image processing unit,
wherein, if the first setting time is shorter than the second setting time as a result of comparison by the comparison unit, the control unit executes control to perform the reconfiguration processing after having performed the first setting processing, and if the first setting time is not shorter than the second setting time, to perform the second setting processing after having performed the reconfiguration processing.

3. The image processing apparatus according to claim 2, wherein the comparison unit calculates the second setting time based on the image processing content.

4. The image processing apparatus according to claim 1, further comprising:
a third storage unit configured to store setting information for setting the image processing content for each image processing content for the image processing unit,
wherein the generation unit acquires the setting information corresponding to the image processing content input by the input unit, from the third storage unit, and converts the acquired setting information into the rewriting data.

5. The image processing apparatus according to claim 1, further comprising:
a determination unit configured to determine whether the reconfiguration processing is needed based on the image processing content input by the input unit,
wherein, if it is determined by the determination unit that the reconfiguration processing is not needed, the selection unit does not select the circuit configuration data, the control unit sets the image processing content for the image processing unit without performing the reconfiguration processing.

6. The image processing apparatus according to claim 1, wherein the image processing content is image processing for image data to be printed.

7. The image processing apparatus according to claim 1, wherein the image processing content is image processing for optically read out image data.

8. The image processing apparatus according to claim 1, wherein the image processing unit is a programmable logic device.

9. A control method for an image processing apparatus including an input unit configured to input image data, and image processing content to be executed on the image data, a first storage unit configured to store a plurality of circuit configuration data, a second storage unit, and an image processing unit configured to include a reconfiguration circuit, which enables reconfiguration according to the circuit configuration data stored in the second storage unit, to execute image processing for image data, the method comprising:

inputting, in the input unit, image data and image processing content to be executed on the image data;

selecting any one of a plurality of circuit configuration data stored in the first storage unit, and storing the selected circuit configuration data in the second storage unit;

generating rewriting data for rewriting circuit configuration data stored in the second storage unit, based on the input image processing content;

after performing first setting processing for rewriting a part of the circuit configuration data stored in the second storage unit according to the generated rewriting data, executing control to perform reconfiguration processing for reconfiguring a circuit configuration of the image processing unit according to the circuit configuration data stored in the second storage unit; and deciding whether the image processing unit is performing image processing, wherein, if it is decided that the image processing unit is performing image processing, executing control to perform a first setting processing, and upon a completion of image processing by the image processing unit, executing control to perform the reconfiguration processing.

10. The control method for the image processing apparatus according to claim 9, further comprising:

if a decision is made that the image processing unit is not performing image processing, comparing a first setting time required for the first setting processing, and a second setting time required for a second setting processing for setting the image processing content for the image processing unit, wherein, if the first setting time is shorter than the second setting time as a result of the comparison, executing control to perform the reconfiguration processing after having performed the first setting processing, and if the first setting time is not shorter than the second setting time, executing control to perform the second setting processing after having performed the reconfiguration processing.

11. The control method for the image processing apparatus according to claim 10, wherein the second setting time is calculated based on the image processing content.

12. The control method for the image processing apparatus according to claim 9, wherein the image processing apparatus further comprises:

a third storage unit configured to store setting information for setting the image processing content for each image processing content for the image processing unit, wherein the generating step acquires the setting information corresponding to the image processing content input by the input unit from the third storage unit, and converts the acquired setting information into the rewriting data.

13. The control method for the image processing apparatus according to claim 9, further comprising:

determining whether the reconfiguration processing is needed based on the image processing content input by the input unit; and if it is determined that the reconfiguration processing is not needed, the circuit configuration data is not selected, and the image processing content is set to the image processing unit without performing the reconfiguration processing.

\* \* \* \* \*